(12) United States Patent
Wu

(10) Patent No.: US 6,414,689 B1
(45) Date of Patent: Jul. 2, 2002

(54) GRAPHICS ENGINE FIFO INTERFACE ARCHITECTURE

(75) Inventor: Shyan-Dar Wu, Saratoga, CA (US)

(73) Assignee: Mediaq Inc., Santa Clara, CA (US)

( * ) Notice: Subject to any disclaimer, the term of this patent is extended or adjusted under 35 U.S.C. 154(b) by 0 days.

(21) Appl. No.: 09/261,928

(22) Filed: Mar. 3, 1999

(51) Int. Cl.[7] .................................................. G09G 5/36
(52) U.S. Cl. ........................ 345/558; 345/564; 345/537; 710/55
(58) Field of Search ................................ 345/558, 519, 345/564, 556, 531, 501, 530, 537, 538, 572; 710/52–55; 365/189.01–189.03, 189.05

(56) References Cited

U.S. PATENT DOCUMENTS

| | | | | |
|---|---|---|---|---|
| 5,027,326 A | * | 6/1991 | Jones | 365/189.02 |
| 5,295,240 A | * | 3/1994 | Kajimoto | 345/170 |
| 5,557,733 A | * | 9/1996 | Hicok et al. | 345/531 |
| 5,577,203 A | * | 11/1996 | Reinert et al. | 345/558 |
| 5,745,791 A | * | 4/1998 | Peek et al. | 710/52 |
| 5,777,629 A | * | 7/1998 | Baldwin | 345/519 |

* cited by examiner

Primary Examiner—Kee M. Tung
(74) Attorney, Agent, or Firm—Nguyen & Associates

(57) ABSTRACT

A Graphics Engine (GE) FIFO interface architecture that allows the transfers of reduced address information from the GE to the frame buffer is provided. The FIFO interface architecture further allows the GE to be isolated from the Memory Interface Unit (MIU) or the Central Processor Interface Unit (CIF) such that the GE can operate at a different frequency from the MIU and the CPU. Address information is provided using two flag bits End of Line (EOL) and Add One (AO). In write mode, flag bits EOL and AO are used to determine the next address in the frame buffer where processed data from the GE is to be stored. In line draw mode, flag bits EOL and AO are used to determine the address in the frame buffer for data retrieval. Such data retrieval allows a rendered line to perform background and foreground color ROP in line draw commands. Flag bit EOL indicates whether the GE needs to skip to the next scan line (e.g., the end of the current scan line has been reached). Flag bit AO indicates whether an offset value needs to be added/subtracted to the present address in determining the next address.

22 Claims, 5 Drawing Sheets

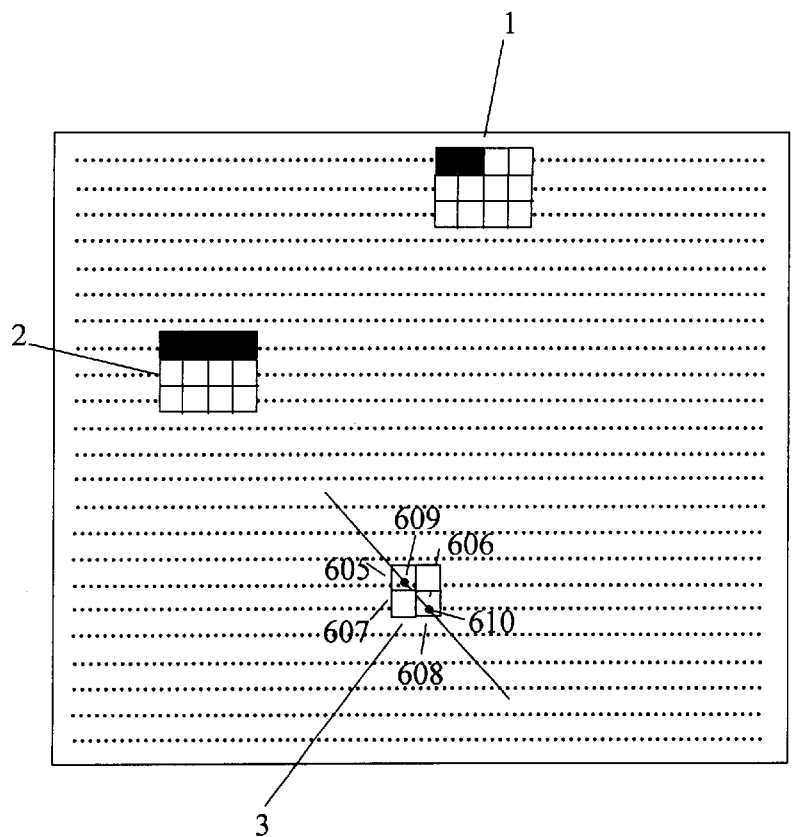

GRAPHICS ENGINE FIFO INTERFACE ARCHITECTURE

FIELD OF THE INVENTION

The invention generally relates to computer systems, and more particularly relates to graphics engine interface.

BACKGROUND OF THE INVENTION

With the advances of semiconductor and computer technology, computer systems are becoming faster and at the same time smaller in size. Desktop and even laptop computer systems now possess processing speeds of mainframe computers that used to fill up a small room. Even hand-held computer systems such as personal digital assistants (PDA), which are becoming more popular, are getting more powerful. As computer systems become more miniaturized and inexpensive, more demands are constantly being required of them as well. One such demand is speed or performance.

As computer systems become more powerful and more miniaturized, power-conservation also presents a difficult challenge to overcome. Because of their small size, hand-held computer systems are powered by battery which have limited operating duration. Since more power is required for faster and more powerful processors, innovative solutions are required to conserve power and thereby extend the battery operating duration.

To increase the speed of computer systems, a decentralized approach has been implemented in their design. Within each computer system there are many integrated circuits (IC) designed to perform dedicated functions such as a memory controller, a hard disk controller, a graphics/video controller, a communications controller, and other peripheral controllers. These dedicated integrated circuits can simultaneously perform the different functions independently. Such decentralized approach minimizes bottlenecks and therefore helps improve the speed of computer systems.

Even so, the tasks performed by computer systems are becoming increasingly more complex. This is particularly true in the area of computer graphics. Computer systems are now capable of generating complex and high-resolution 3 dimensional (3D) graphics objects with lifelike movements. These 3D graphics objects require a great deal of data transfer (e.g., retrieving the attributes data related to the object such as data block height, width, color, and texture from system memory) and processing (e.g., computing the color and texture values for the object's pixels to accurately reflect the object's shading at a position) These 3D graphics objects also require a great deal of power to generate. For these reasons, on-going efforts are being made to constantly improve power conservation and performance in the area of computer graphics.

Generally, in a graphics computer system, computer graphics objects are first constructed with combinations of graphics primitives using a graphics application program. The graphics primitives are connected together to form a geometrical model of the desired graphics object or picture to be displayed on the monitor. The graphics model is a linked data structure that contains a detailed geometric description of the graphics object and its associated attributes (e.g., color, shading, texture, lighting, etc.) describing how the object should appear. Data related to the graphics model are stored in the computer system memory. On the other hand, data ready to be displayed on the monitor is stored as a pixmap in a frame buffer (i.e., a pixel pattern mapped into the frame buffer). In response to a user graphics command (e.g., a Raster Operation (ROP)), graphics data from the system memory and from the frame buffer are retrieved with the help of the Central Processor (CPU) and the Memory Interface Unit (MUI) and provided to the Graphics Engine (GE) for processing. The processed data is then provided with the help of the MIU to the frame buffer for subsequent display by the monitor.

In transferring data from/to the system memory and the frame buffer, First-In-First-Out (FIFO) buffers may be used so that the CPU, MIU, and GE can operate asynchronously thereby allowing these units to reach their maximum performance. However, when the GE provides the processed data to the frame buffer, an address is traditionally provided to indicate the location in the frame buffer where the processed data is to be stored. Because the associated address may require between 16–21 bits thereby increasing the required size of the FIFO buffer. Such a large FIFO buffer requires added gates which means increased costs as well as increased power consumption. Moreover, the traditional approach also means that the GE is primarily responsible for computing the address which slows down the processing speed and increases the power consumption of the GE.

Thus, a need exists for an apparatus, system, and method for passing address information in a GE FIFO architecture using a reduced-sized FIFO buffer while improving the processing speed and decreases the power consumption of the GE.

SUMMARY OF THE INVENTION

Accordingly, the present invention provides an apparatus, system, and method for passing address information in a Graphics Engine (GE) FIFO interface architecture using a reduced-sized FIFO buffer while improving the processing speed and decreases the power consumption of the GE. Under the present invention, the GE interfaces with all the external blocks through the FIFO interface thereby allowing the GE's clock to run asynchronously with other blocks.

The present invention meets the above need with a First-In-First-Out (FIFO) interface apparatus that is coupled to a Central Processing Unit (CPU), a Graphics Engine (GE), and a frame buffer. The FIFO interface apparatus comprises a write FIFO buffer coupled between the GE and the frame buffer. The write FIFO buffer is used for transferring data packets generated by the GE to the frame buffer wherein each data packet includes a predetermined number of data bits processed by the GE, a first address flag bit, and a second address flag bit. The first and second address flag bits are used to determine a next write address in the frame buffer for storing the predetermined data bits from an immediately subsequent data packet. More particularly, the first address flag bit indicates whether the predetermined number of data bytes in each data packet is to be added to a present write address to determine the next write address. The second address flag bit indicates whether a stride is to be added to an updated starting write address to determine the next write address. A stride is defined as the number of bytes between the first pixel of one scan line to the first pixel of the next scan line.

The FIFO interface apparatus may further comprises a line draw FIFO buffer coupled to a line draw engine, which in turn is connected to the GE, and the frame buffer. The line draw FIFO buffer is used in transferring the first and second address flag bits from the line draw engine to the frame buffer. The first and second address flag bits are used to determine a next read address in the frame buffer for retrieving data stored in the read address of the frame buffer. In particular, the first address flag bit indicates whether the predetermined number of data bytes in each data packet is to be added to a present read address to determine the next read address. The second address flag bit indicates whether a stride is to be added to the present read address to determine the next read address. A stride is defined as the number of bytes between the first pixel of one scan line to the first pixel of the next scan line.

All the features and advantages of the present invention will become apparent from the following detailed description of its preferred embodiment whose description should be taken in conjunction with the accompanying drawings.

BRIEF DESCRIPTION OF THE DRAWINGS

FIG. 4 illustrates an exemplary packet including a command instruction and the corresponding index information stored in CPU CMD read FIFO 303.

FIG. 5 illustrates an exemplary data packet including data bits, byte-enable bits, and address flag bits EOL and AO stored in MIU DST write FIFO 306.

FIG. 6 illustrates exemplary scenarios for the different permutations of address flag bits EOL and AO in accordance to the present invention.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in an embodiment involving a graphics engine, it is to be appreciated that the present invention is also applicable to other embodiments involving a video engine, a 3-dimensional (3D) engine, or others.

In accordance to the present invention, two flag bits, EOL and AO, which carry address information for a block of pixel data, are passed to the MIU through the MIU DST Write First-In-First-Out (FIFO). Using the two flag bits together with the address for the current block of pixel data, the address of the location in the frame buffer where the next block of pixel data is to be stored can be computed. More particularly, the flag bit EOL indicates whether it is necessary to skip to the next data block line (e.g., the end of the current data block has been reached) and the flag bit AO indicates whether a predetermined offset value is to be added to the current address. In so doing, the address in the frame buffer for storing the next block of pixel data can be determined with just two bits thereby greatly reducing the number of address bits required to be passed to the MIU. In addition, the task of address calculation primarily resides with the MIU in accordance to the present invention thereby improving the processing speed and the power conservation for the GE.

Figure 1:
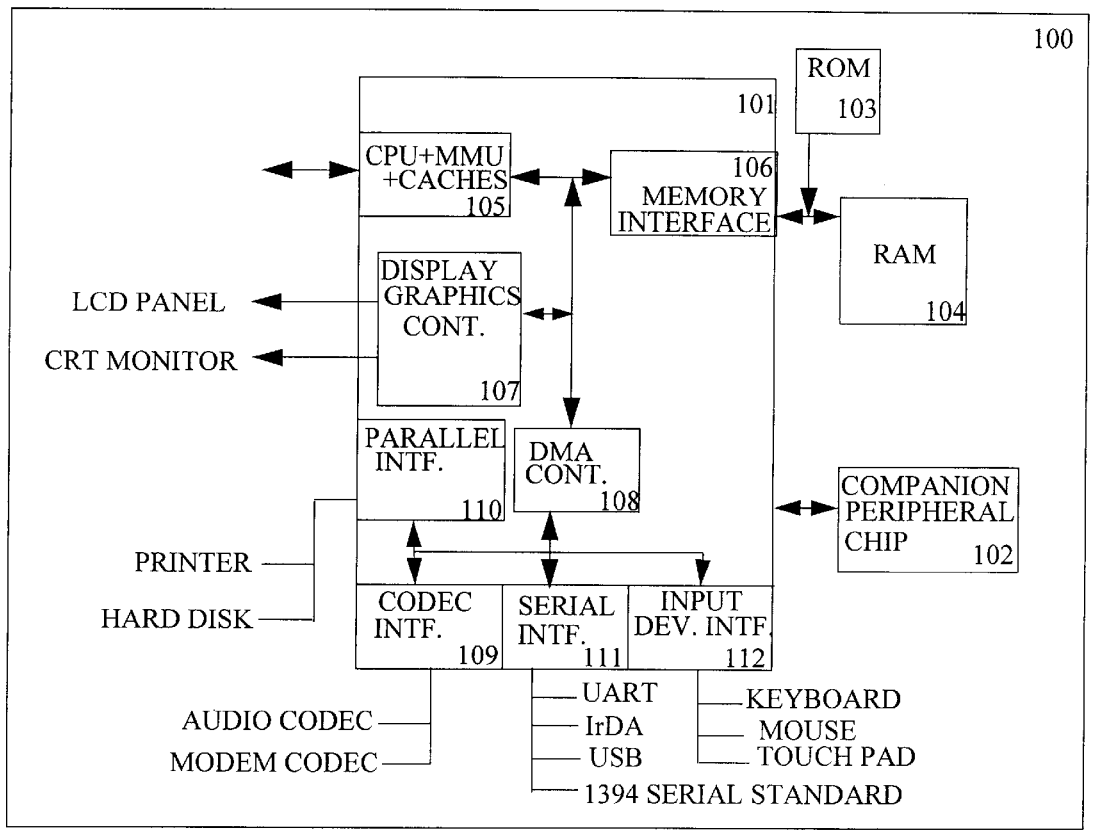
FIG. 1 is a high-level block diagram illustrating a computer system that implements the present invention.

Reference is now made to FIG. 1 illustrates, for example, a high-level diagram of computer system 100 upon which the present invention may be implemented or practiced. More particularly, computer system 100 may be a laptop or hand-held computer system. It is to be appreciated that computer system 100 is exemplary only and that the present invention can operate within a number of different computer systems including desk-top computer systems, general purpose computer systems, embedded computer systems, and others.

As shown in FIG. 1, computer system 100 is a highly integrated system which includes of integrated processor circuit 101, peripheral controller 102, read-only-memory (ROM) 103, and random access memory (RAM) 104. The highly integrated architecture allows power to be conserved. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, input device interface 112, and flat panel interface (FPI) 113. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
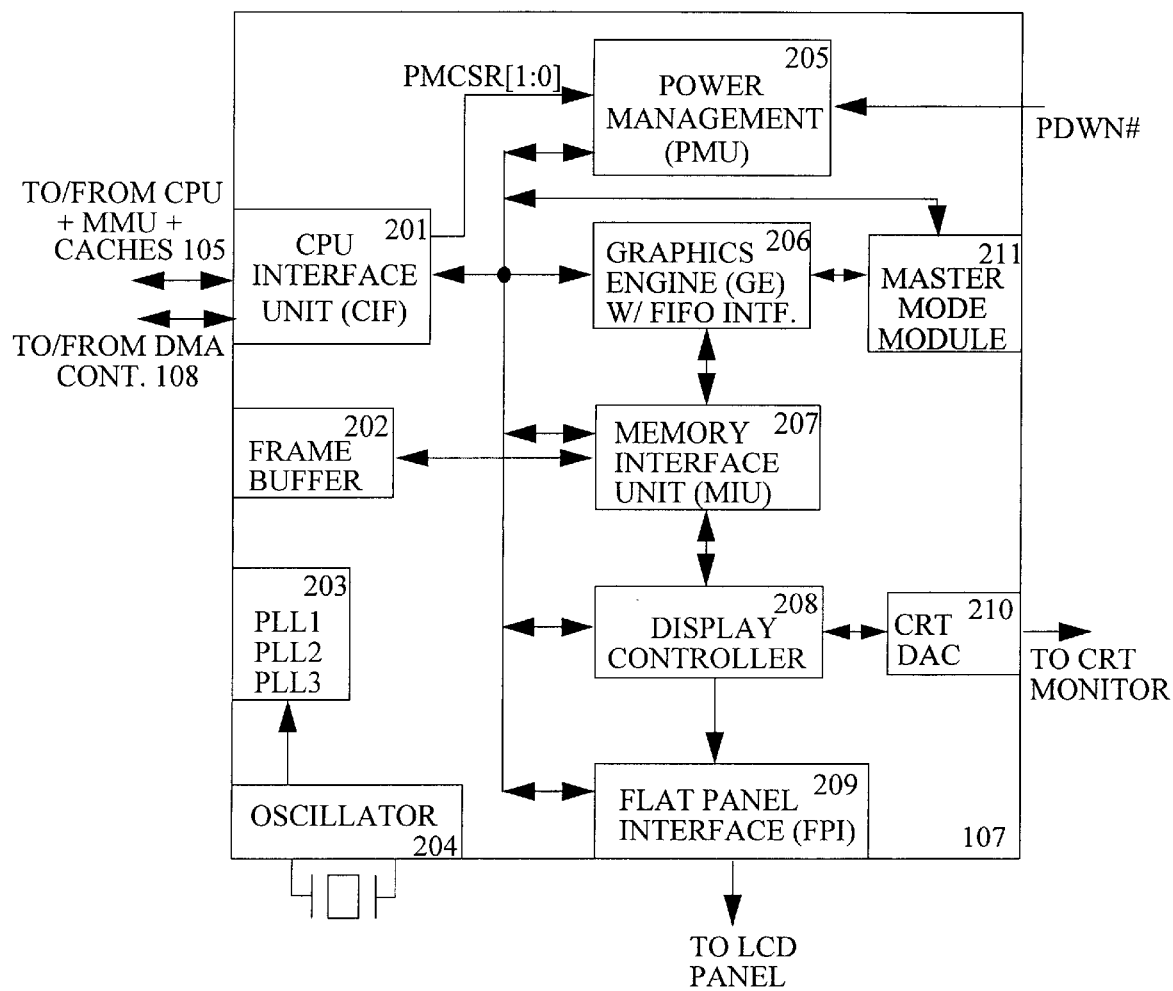
FIG. 2 is a block diagram illustrating in greater detail graphics/display controller 107 illustrated in FIG. 1.

In the preferred embodiment, the present invention is implemented as part of graphics/display controller 107. Reference is now made to FIG. 2 illustrating graphics/display controller 107 in greater detail. In general, graphics/display controller 107 comprises CPU Interface Unit (CIF) 201, frame buffer, 202, Phase Lock Loop (PLL) circuit 203, oscillator 204, Power Management Unit (PMU) 205, Graphics Engine (GE) w/ FIFO Interface 206, Memory Interface Unit (MIU) 207, display controller 1&2 (DC1 & DC2) 208, Flat Panel Interface (FPI) 209, CRT Digital-to-Analog Converter (DAC) 210, and master mode module 211. CIF 201 provides the interface to processing unit 105 and DMA controller 108. Accordingly, CIF 201 routes requests and data received from processing unit 105 to the desired destination. In particular, CIF 201 sends register read/write requests and memory read/write requests from the host CPU processing unit 105 and DMA controller 108 to the appropriate modules in graphics/display controller 107. For example, memory read/write requests are passed on to MIU 207 which in turn reads/writes the data from/to frame buffer 202. CIF 201 also serves as the liaison with DMA controller 108 to fetch data from system memory (ROM 103 and RAM 104) and provides the data to GE 206 and MIU 207. Further, CIF 201 has a power mode register PMCSR that is programmable by the host CPU in processing unit 105 to control the power state of graphics/display controller 107.

Frame buffer 202 is used to store the pixmap (i.e., a pixel pattern mapped into the frame buffer) of the image to be displayed on the monitor as well to act as a temporary buffer for various purposes. Oscillator 204 provides a reference clock signal to PLL circuit 203 which in turn generates three programmable phase lock loop clock signals: PLL1, PLL2, and PLL3 for the different modules in graphics/display controller 107. More particularly, while clock signal PLL1 is used for GE 206 and MIU 207, clock signals PLL2 and PLL3 are used for display controller 1&2 (DC1 & DC2) 208. PMU 205 monitors PMCSR register in CIF 201 together with external signal PDWNLI to determine the desired power state. In turn, PMU 205 enables or disables the different modules as well as performs the required power-on and power-off sequence of the different modules as pertaining to a particular power state. GE 206 processes graphics image data which is then stored in frame buffer 202 based on commands issued by the host CPU. It should be clear to a person of ordinary skill in the art that some commands may require data both from frame buffer 202 and from system memory (e.g., a command to carry out a Raster Operation (ROP)). Master mode module 211 allows GE 206 to fetch queued commands in system memory (ROM 103 and RAM 104) which are issued by the host CPU.

MIU 207 controls all read and write transactions from/to frame buffer 202. Such read and write requests may come from the host CPU via CIF 201, GE 206, display controller 1&2 (DC1 & DC2) 208, FPI 209 etc. Display controller 208 retrieves image data from frame buffer 202 via MIU 207 and serializes the image data into pixels before outputting them to FPI 209 or CRT DAC 210. Accordingly, display controller 1&2 208 generates the required horizontal and vertical display timing signals. If the display device involved is a LCD, pixel data from display controller 208 is sent to FPI 209 before being passed on to the LCD. In the preferred embodiment, display controller 1&2 208 comprises a display controller 1 (DC1) that is normally used for a flat panel display (FPD) and a display controller 2 (DC2) that is normally used for a CRT. FPI 209 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from display controller 208 to analog Red Green and Blue (RGB) signals to be displayed on the CRT monitor.

Figure 3:
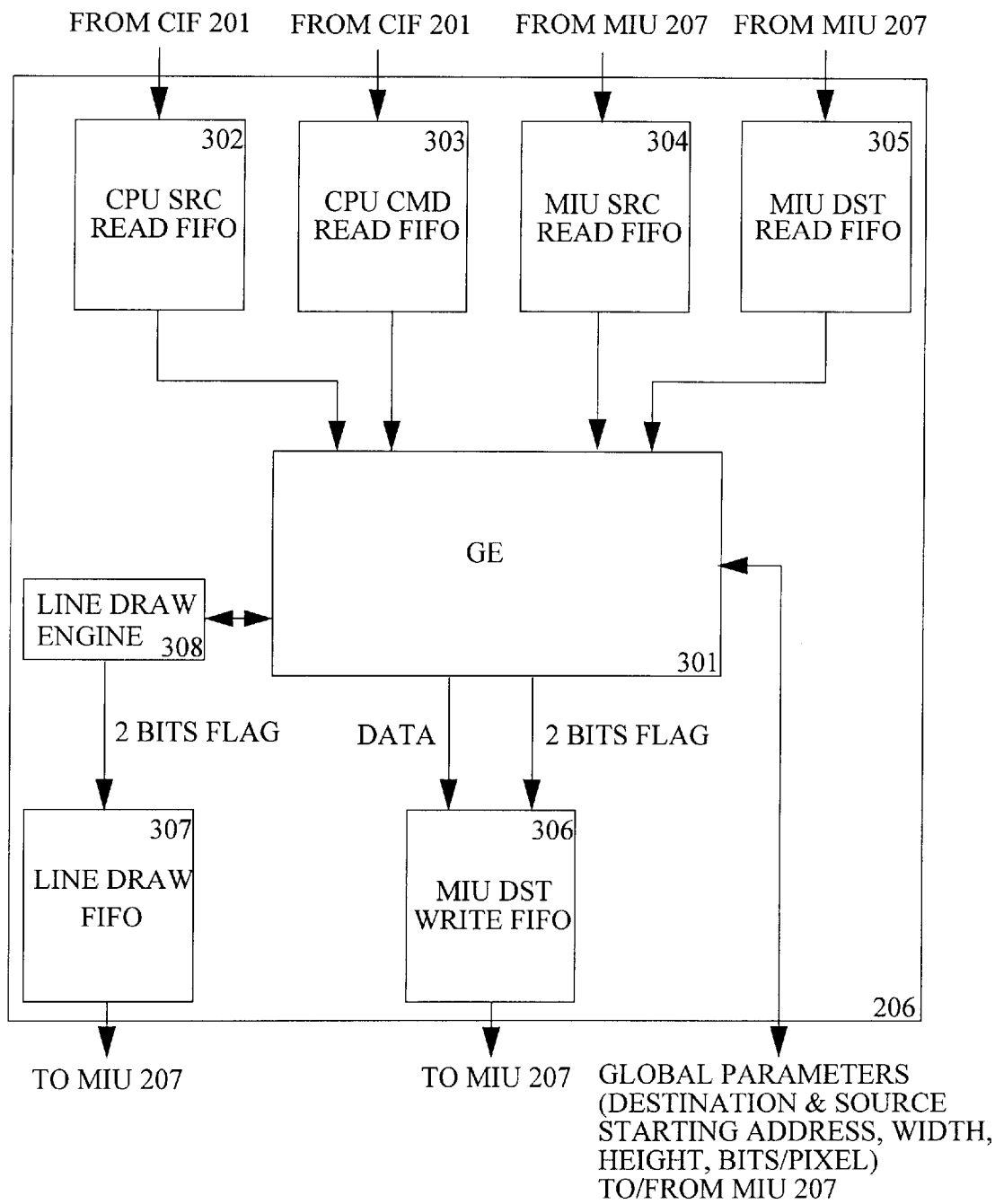
FIG. 3 is a block diagram illustrating in greater detail Graphics Engine w/ FIFO Interface 206 in accordance to the present invention.

Reference is now made to FIG. 3 illustrating in greater detail GE w/ FIFO Interface 206 which implements the present invention. As shown in FIG. 3, GE w/ FIFO Interface 206 includes GE 301, CPU SRC read FIFO 302, CPU CMD read FIFO 303, MIU SRC read FIFO 304, MIU DST read FIFO 305, MIU DST write FIFO 306, Line draw FIFO 307, and line draw engine 308. In accordance to the present invention, CPU SRC read FIFO 302, CPU CMD read FIFO 303, MIU SRC read FIFO 304, and MIU DST read FIFO 305 are used in read operations. Conversely, MIU DST write FIFO 306 is used in write operations. As its name suggests, line draw engine 308 is used for line drawing. Under the present invention, the color of the line drawn by line draw engine 308 reflects that of the foreground color. Line draw FIFO 307 is used to provide destination pixel address information to MIU 207 to retrieve data from frame buffer 202 for use by line draw engine 308. Similar to the architecture that is used for MIU SRC write FIFO 306, line draw FIFO 307 only uses two flag bits of address information. By using FIFO interface architecture, the CPU, MIU 207, GE 301 are allowed to operate asynchronously at their optimum clock speeds.

In a GE command read operation, the CPU sends a graphics command instruction to GE 301 through CPU CMD read FIFO 303. In response, GE 301 decodes and executes the command instruction to perform a desired graphics processing task. Depending on the command instruction, the graphics processing task may require data from system memory, pixmap source data from frame buffer 202, and/or pixmap destination data from frame buffer 202. Data from system memory may be required, for example, when the command instruction involves generating a background image using a stored background data pattern stored in the system memory. Such background data pattern is a predetermined block of image data. Pixmap source data generally denotes a block of data that is found at a first designated (source) location in the frame buffer where the pixmap is stored and is required for a particular command. Conversely, pixmap destination data generally denotes a block of data that is found at a second designated (destination) in the pixmap and is required for a particular command instruction. Accordingly, the source and destination locations may change for each command instruction. Pixmap source data and destination data may be required, for example, when the command instruction involves performing a logical raster operation (ROP) such as AND, XOR, etc. on the pixmap source and destination data. There are command instructions for graphics operations such as a command to move an object from one location to a different location on the screen that require system memory data, pixmap source data from frame buffer 202, and pixmap destination data from frame buffer 202 to do a ROP with source data. In moving the object from the source location to the destination location, GE 301 may need to compute the object's shading change between the source and destination locations.

To access these data, the starting address as well as the block width and height are normally required. Other information related to these data may also be required for reasons obvious to a person of ordinary skill in the art such as the number of data bits per pixel, whether the data is color or monochrome, etc. The above information is communicated to GE 301 through the command read FIFO and stored in registers inside GE 301 in advance. In the present embodiment, index information is provided along with the associated command instruction through CPU CMD read FIFO 303. FIG. 4 illustrates an exemplary packet including a command instruction and the corresponding index information. When decoded by GE 301, the index information indicates the specific registers where the CPU source data starting address, the MIU source data starting address, the MIU destination data starting address, the data block width, the data block height, etc. required for the command instruction presently under consideration are stored in GE 301.

CPU SRC read FIFO 302 is used to buffer data from system memory before transferring it to GE 301 for storing and processing. By storing data from system memory in GE 301 instead of frame buffer 202, the data pattern is readily available for GE 301 to process without having to perform a transfer from frame buffer 202 to GE 310 every time it is needed. The advantage provided by the present invention is better illustrated in the following example. Supposed that a screen background image (e.g., a wall paper) is to be rendered using a data pattern of 8×8 pixels from system memory, under the present invention, the data pattern is programmed from the system memory to the pattern registers (not shown) in GE 301 through CPU CMD read FIFO 303. GE 301 then executes the pattern Bitblt instruction received via CPU CMD read FIFO 303 to render the data pattern stored in the pattern registers by duplicating the data pattern. Because the data pattern is stored in GE 301, additional reads of the data pattern from system memory are not necessary thereby saving valuable processing cycles.

MIU SRC read FIFO 304 is used to buffer the pixmap source data from frame buffer 202 before transferring it to GE 301 for processing. MIU DST read FIFO 305 is used to buffer the pixmap destination data from frame buffer 202 before transferring GE 301 for processing. In carrying out a command instruction that requires pixmap source data and destination data, MIU 207 sends the pixmap source data and pixmap destination data to GE 301 through MIU SRC read FIFO 304 and MIU DST read FIFO 305, respectively. Upon receiving the pixmap source data and pixmap destination data, GE 301 then executes the command instruction that it has received from the CPU via CPU CMD read FIFO 303. In so doing, FIFOs are used to buffer command instructions and their associated data before forwarding them to GE 301.

After GE 301 completes a processing task, it transfers the processed data to frame buffer 202 via MIU 207. Subsequently, display controller 208 retrieves the pixmap data with the help of MIU 207 and sends it to a display monitor (e.g., a CRT monitor or a LCD panel) for display. Under the present invention, the processed data is first provided to MIU DST write FIFO 306 which in turn passes it on to MIU 207. In transferring processed data to frame buffer 202, however, GE 301 needs to communicate to MIU 207 the address of the location in frame buffer 202 where the processed data is to be stored. In accordance to the present invention, GE 301 communicates such address information to MIU 207 using two flag bits: End of Line (EOL) and Add One Boundary (AO).

In the preferred embodiment, the two flag bits EOL and AO are included as part of a data packet which includes 128 data bits and 16 byte-enable bits. FIG. 5 illustrates an exemplary data packet used in the preferred embodiment. Since the preferred embodiment supports three graphics resolution modes: 8-bits per pixel, 16-bits per pixel, and 32 bits per pixel, the 128 data bits may in turn carry sufficient data bits for 16 pixels, 8 pixels, or 4 pixels respectively. The byte-enable bits indicate which one of the corresponding bytes is enabled for display. There are 16 byte-enable bits because there may be up to 16 pixels in each 128 data bits. In accordance to the present invention, the two flag bits EOL and AO are used for determining the address for the next 128 data bits boundary. Under the present invention, the 128 data bits are the width of the data path that GE 301 has processed. In other words, the pixmap data block that GE 301 processes during every clock cycle composes of a number of 128 data bits. Under the present invention, it is assumed that prior to transferring the processed data block to MIU 207, GE 301 has already transferred global information related to the data block such as destination & source starting address, the processed data block's width and height, bits per pixel, and others for each command to MIU 207. These global information are passed to MIU 207 in the beginning of each command. More particularly, at the beginning of each command, GE 301 issues a signal which when detected by MIU 207 causes MIU 207 to latch these global signals as the command information.

Using the starting address, MIU 207 can determine the frame buffer location to store the first 128 data bits of the data block. As discussed in FIG. 5 above, each data packet consists of 128 data bits, 16 byte-enable bits, and two flag bits, EOL and AO. The two flag bits, EOL and AO, from the first packet having the first 128 data bits are used to determine ahead of time the address for the frame buffer location to store the next 128 data bits of the second packet. Similarly, the two flag bits, EOL and AO, from the second packet having the second 128 data bits are used to determine ahead of time the address for the frame buffer location to store the 128 data bits of the third packet. As such, the frame buffer address location for subsequent data bits can be determined ahead of time in a similar fashion.

Flag bit AO indicates whether the number of bytes in 128 data bits (which is 16 bytes) contained in a packet is to be added to the current address to determine the next address. Because MIU 207 always generates data based on a 128-bits boundary, adding 16 bytes is the same as adding one 128-bit boundary. When flag bit AO is asserted, MIU 207 adds an offset value which is the number of bytes (i.e., 16 bytes) in 128 data bits to the current address. Conversely, when flag bit AO is deasserted, MIU 207 adds no offset value to the current address. Flag bit EOL indicates whether the end of the data block width under consideration has been reached. When flag bit EOL is asserted indicating the end of the data block width has been reached, the first (i.e., starting) address on the next data block line becomes the next address. In other words, MIU 207 jumps to the starting address of the next (i.e., immediately subsequent) data block line. Otherwise, when flag bit EOL is deasserted indicating the end of the current data block width has not been reached, no action is taken in response to the flag bit EOL. In the current embodiment, MIU 207 determines the first address of the next data block line by adding or subtracting a STRIDE value to the data block's starting address (which may be continuously updated) depending on the pixel rendering direction. The STRIDE value is added if the pixel rendering direction is positive and is subtracted if the pixel rendering direction is negative. The STRIDE value is defined as the number of bytes from the beginning pixel of a first scan line to the beginning pixel of an immediate subsequent (i.e., second) scan line. In other words, the STRIDE value essentially consists of the number of bytes in the maximum frame buffer scan line. For example, if the graphics system is presently engaged in a 1280×1024 pixels resolution mode in 8-bits per pixel mode, the STRIDE value is 1280 in this case.

Table 1 below provides the possible permutations of flag bits EOL and AO in accordance to the present invention.

TABLE 1

| EOL | AO |
|-----|----|
| 0   | 1  |
| 1   | 0  |
| 1   | 1  |

As shown in Table 1, there are three possible permutations of flag bits EOL and AO. Reference is now made to FIG. 6 illustrating a monitor screen with scan lines represented by dotted lines. As is well-known in the industry, each scan line is a row of pixels wherein the data (e.g., color, attributes, etc.) related to each pixel is stored in a location in frame buffer 202. The locations storing pixel data in frame buffer 202 are typically arranged such that their order corresponds to the sequential order of the pixels in the scan lines of a monitor screen. Such an order allows pixel data to be conveniently retrieved and sent to the display monitor for display. FIG. 6 demonstrates three exemplary scenarios that correspond to the three permutations in Table 1. In the first permutation, EOL bit is set LOW and AO bit is set HIGH. This case is labeled as scenario 1 and is illustrated, as an example, in FIG. 6. In scenario 1, GE 301 is not yet at EOL as indicated by bit EOL being LOW. Because 128 data bits are to be rendered by GE 301 as indicated by bit AO being HIGH, MIU 207 computes the next address by adding/subtracting an offset value of 128 data bits (i.e., one boundary of 128 bits) in the current mode to/from the present address. As illustrated in FIG. 6, scenario 1 involves the rendering of an exemplary data block having a width of four 128-bits data packets and a height of three 128-bits data packets. A dark 128-bits data packet indicates that it has been rendered by GE 301 while a light 128-bits data packet indicates that it has not been rendered by GE 301. The light data packet which immediately follows the second dark data packet in the first row of the data block represents the data packet of 128 bits to be rendered next. The address of this light data packet is determined by adding one 128-bits boundary to the present address which is represented by the second dark data packet in the first row. This helps to visualize the next address in frame buffer 202 that is determined by MIU 207 in accordance to the present invention under scenario 1.

In the second permutation, EOL bit is set HIGH and AO bit is set LOW. This case is labeled as scenario 2 and is illustrated, as an example, in FIG. 6. In scenario 2, GE 301 is at EOL as indicated by bit EOL being HIGH. Flag bit AO is LOW indicating that an offset value of 128 data bits (i.e., one boundary of 128 bits) needs not be added to the present address. As such, under scenario 2, MIU 207 computes the next address by adding/subtracting a STRIDE value to/from the starting address of the block data. As illustrated in FIG. 6, scenario 2 involves the rendering of an exemplary data block having a width of four 128-bits data packets and a height of three 128-bits data packets. A dark 128-bits data packet indicates that it has been rendered by GE 301 while a light 128-bits data packet indicates that it has not been rendered by GE 301. The first light data packet in the second row (line) of the data block represents the data packet of 128 bits to be rendered next. The address of this light data packet is determined by adding a STRIDE value to the starting address of the data block which is represented by the first dark data packet in the first row. This helps to visualize the next address in frame buffer 202 that is determined by MIU 207 in accordance to the present invention under scenario 2.

In the third permutation, EOL bit is set HIGH and AO bit is set HIGH. This permutation occurs exclusive in line rendering especially when the line has a gradual slope. The use of flag bits EOL and AO in line drawing is discussed in more details below. This case is labeled as scenario 3 and is illustrated, as an example, in FIG. 6. In scenario 3, GE 301 is at EOL as indicated by bit EOL being HIGH. However, flag bit AO is also HIGH. As such, under scenario 3, MIU 207 computes the next address by adding/subtracting a STRIDE value to the starting address of the data block and then adding one 128-bits boundary to/from the updated starting address. As illustrated in FIG. 6, scenario 3 involves the rendering of a line through points 609 and 610 which are located within a data block having a width of two 128-bits data packets and a height of two 128-bits data packets. As shown, point 609 is located in data packet 605 and point 610 is located in data packet 608. By adding the STRIDE value to the starting address of the data block as suggested by the EOL bit being set HIGH, the address of rectangle 607 on the next row (line) can be derived. However since point 610 is located inside rectangle 608, an offset value of 128 data bits (i.e., one boundary of 128 bits) is further added to the address as suggested by the AO bit being set HIGH. The address of rectangle 608 containing point 610 is therefore obtained.

The permutation wherein both the EOL bit and the AO bit are set LOW is not a possibility in accordance to the present invention. The reason is that the EOL bit and the AO bit are only provided to MIU 207 in a packet that includes data rendered by GE 301. Since the rendered data is at least 128 bits (one data path width), address offsetting is needed for the next data packet.

Figure 7:
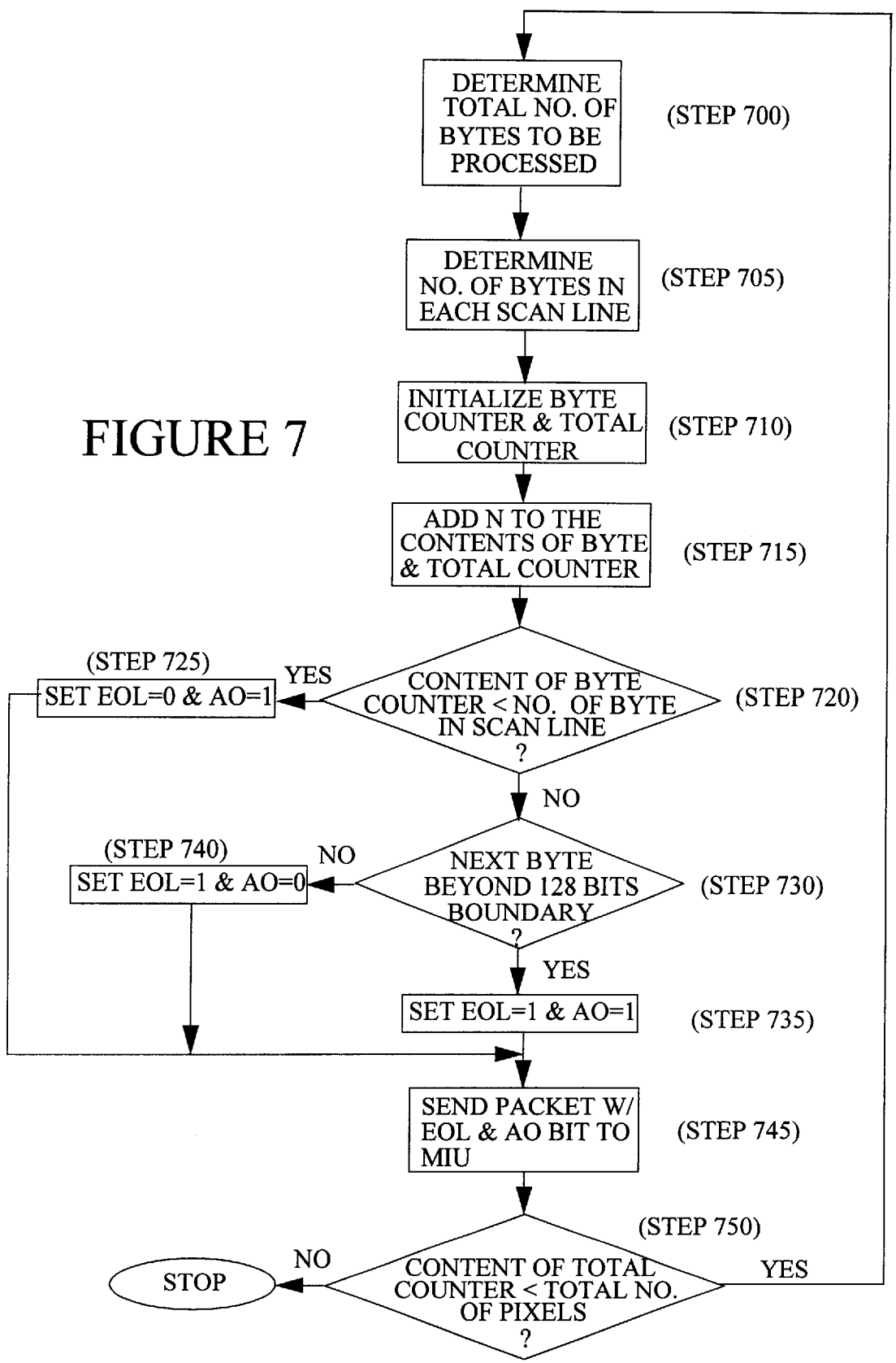
FIG. 7 is a flow chart of the steps involved in setting the EOL and AO address flag bits in a graphics rendering operation.

Reference is now made to FIG. 7 illustrating exemplary steps performed by GE 301 in setting flag bits EOL and AO. Using the data block width and height, GE 301 can determine the total number of bytes that are required to be processed in the present task (step 700). Since there are 8 bits in each byte, GE 301 knows that there are 16 bytes in 128 bits of data. GE 301 determines the display resolution mode to determine the number of bytes available in each scan line (step 705). The byte counter, which is used to monitor the number of bytes used up in a scan line and the total counter, which is used to monitor the total number of bytes used up are initialized to zero (0) in step 710. Upon the completion of 128 bits of processed data bits, GE 301 adds the value 16 (i.e., there are 16 bytes in 128 bits) to the content of the byte counter and the total counter (step 715). Then, GE 301 compares the value of the byte counter content with the number of bytes available in each scan line (step 720). If the value of the byte counter content is less than the number of bytes available in each scan line indicating that the end-of-the-line has not been reached, bit EOL is set LOW and bit AO is set HIGH (step 725). Otherwise, if the value of the byte counter content is equal to or greater than the number of bytes available in each scan line indicating that the end-of-the-line has been reached, GE 301 then determines whether the next byte is beyond the 128 bits boundary (step 730). If the next byte is beyond the 128 bits boundary, bit EOL is set HIGH and bit AO is set HIGH (step 735). On the other hand, if the next byte is still within the 128 bits boundary, bit EOL is set HIGH and bit AO is set LOW (step 740). After flag bits EOL and AO are set (i.e., in steps 725, 730, or 735), GE 301 combines the 128 data bits, the byte-enable bits, and the two flag bits, EOL and AO, into a packet and sends it to MIU DST write FIFO 306 for transferring to MIU 207 (step 745). Next, GE 301 compares the value of the total counter content with the total number of pixels that are required to be processed in the present task (step 750). If the value of the total counter content is less than the total number of pixels, then GE 301 goes back to step 715 to continue setting flag bits EOL and AO. Otherwise, GE 301 stops setting the flag bits because all the data in the data block has been rendered.

While the preferred embodiment implements a byte-based system in monitoring the amount of transferred data in setting flag bits EOL and AO, it should be clear to a person of ordinary skill in the art that a different system such as pixel-based system can also be implemented. In a pixel-based system, the number of pixels contained in each 128 bits of data are computed based on the graphics resolution mode and the pixel count (instead of the byte count) is monitored to keep track of the amount of transferred data.

Referring now back to FIG. 3 illustrating another aspect of the present invention. The concept of using two flag bits EOL and AO or something substantially similar can also be used in retrieving pixmap data stored in frame buffer 202 for line drawing purposes. More particularly, in line drawing, a line may be drawn across different coordinate sectors of a display monitor that have different background colors. When this occurs, it may be desirable to have the line's color ROP conforms to the background color for each sector. To carry out such a task requires that the pixmap data for the different coordinate sectors be retrieved from frame buffer 202 so that the corresponding background colors can be extracted for use in drawing the line. Typically, addresses for the different coordinate sectors are provided to MIU 207 to access the background color. For reasons discussed earlier, such passing of addresses requires large FIFO which is undesirable. In accordance to another aspect of the present invention, two flag bits EOL and AO are provided in place of the address to MIU 207. MIU 207 uses the two flag bits to determine the location in frame buffer 202 to retrieve the pixmap data and send it back to GE 301 which then shares the information with line draw engine 308.

Line draw engine 308, which is well known in the art, is used in combination with GE 301 to render lines. By knowing a starting point (e.g., dot 608 of FIG. 6) coordinates, the line's next incremental point (e.g., dot 609 of FIG. 6) coordinates, and the distance between scan lines, line draw engine 308 can determine whether the line's next incremental point requires a jump to the next scan line and/or whether the line's next incremental point requires an additional offset of the number of pixels represented by 128 data bits in the current mode to be made. Accordingly, line draw engine 308 sets flag bits EOL and AO and sends them to MIU 207 which uses them to determine the frame buffer address storing the desired background color for the next segment of the line. In so doing, the amount of address information required for identifying the location in frame buffer 202 for data retrieval is greatly reduced.

To calculate the next pixel location which is required in setting flag bits EOL and AO, Bresenham algorithm, which should be well known to a person of ordinary skill in the art, can be used. Upon determining the next pixel location, if the next pixel is within the 128-bits boundary, line draw engine 308 proceeds to the next pixel. If the next pixel is beyond the 128-bits boundary, flag bit AO is set to one (1). If the next pixel in on the next scan line, flag bit EOL is set to one (1) and flag bit AO is set or reset depending on the result of Bresenham algorithm.

An embodiment of the present invention, a system, apparatus, and method to reduce the amount of address information transferred in a FIFO interface architecture thereby improving the processing speed and decreases the power consumption of the GE is presented. While the present invention has been described in particular embodiments, the present invention should not be construed as limited by such embodiments, but rather construed according to the below claims.

What is claimed is:

1. A First-In-First-Out (FIFO) interface apparatus coupled to a Central Processing Unit (CPU), a Graphics Engine (GE), and a frame buffer, the FIFO interface apparatus comprising a write FIFO buffer coupled to the GE and the frame buffer, the write FIFO buffer transferring data packets generated by the GE to the frame buffer, wherein each data packet comprising a predetermined number of data bytes processed by the GE, a first address flag bit, and a second address flag bit, the first and second address flag bits are used to determine a next write address in the frame buffer for storing the predetermined data bytes from an immediately subsequent data packet, the first address flag bit indicating whether the predetermined number of data bytes in each data packet are to be added to a present write address to determine the next write address, the second address flag bit indicating whether a number of bytes contained in a scan line are to be added to an updated starting write address to determine the next write address.

2. The FIFO interface apparatus of claim 1 further comprising:
a first read FIFO buffer coupled between the CPU and the GE, the first read FIFO buffer transferring command instructions and related information from the CPU to the GE;
a second read FIFO buffer coupled between the CPU and the GE, the second read FIFO buffer transferring image data from the CPU to the GE;
a third read FIFO buffer coupled between the GE and the frame buffer, the third read FIFO buffer transferring source pixel data from a source address in the frame buffer to the GE; and
a fourth read FIFO buffer coupled between the GE and the frame buffer, the fourth read FIFO buffer transferring destination pixel data from a destination address in the frame buffer to the GE.

3. The FIFO interface apparatus of claim 2 further comprising:
a line draw FIFO buffer coupled to a line draw engine that is connected to the GE, the line draw FIFO buffer coupled to the frame buffer, the line draw FIFO buffer transferring the first and second address flag bits from the line draw engine to the frame buffer, the first and second address flag bits are used to determine a next read address in the frame buffer for retrieving data stored in the read address of the frame buffer, the first address flag bit indicating whether the predetermined number of data bytes in each data packet is to be added to a present read address to determine the next read address, the second address flag bit indicating whether a number of bytes contained in a scan line is to be added to an updated starting read address to determine the next read address.

4. The FIFO interface apparatus of claim 3, wherein an initial read address is used to locate a starting point of the line.

5. The FIFO interface apparatus of claim 2, wherein the related information indicating specific registers in the GE where the CPU source data starting address, the MIU source data starting address, the MIU destination data starting address, the data block width, and the data block height required for the command instruction are stored.

6. The FIFO interface apparatus of claim 1, wherein an initial starting write address is a starting address of a block of data processed by the GE.

7. The FIFO interface apparatus of claim 1, wherein each data packet further includes byte-enable bits indicating which byte of the predetermined number of data bits is enabled for display.

8. A First-In-First-Out (FIFO) interface apparatus coupled to a line draw engine, a Graphics Engine (GE), and a frame buffer, the FIFO interface apparatus comprising a line draw FIFO buffer, the line draw FIFO buffer transferring first and second address flag bits from the line draw engine to the frame buffer, the first and second address flag bits are used to determine a next read address in the frame buffer for retrieving data stored in the read address of the frame buffer, the first address flag bit indicating whether the predetermined number of data bytes in each data packet are to be added to a present read address to determine the next read address, the second address flag bit indicating whether the number of bytes contained in a scan line are to be added to an updated starting read address to determine the next read address.

9. A First-In-First-Out (FIFO) interface apparatus coupled to a Central Processing Unit (CPU), a Graphics Engine (GE), and a frame buffer, the FIFO interface apparatus comprising a write FIFO buffer coupled to the GE and the frame buffer, the write FIFO buffer transferring data packets generated by the GE to the frame buffer, wherein each data packet comprising a predetermined number of data bytes processed by the GE, a first address flag bit, and a second address flag bit, the first and second address flag bits are used to determine a next write address in the frame buffer for storing the predetermined data bytes from an immediately subsequent data packet, the first address flag bit indicating whether the predetermined number of data bytes in each data packet are to be added to a present write address to determine the next write address, the second address flag bit indicating whether the number of bytes contained in a scan line are to be added to an updated starting write address to determine the next write address.

10. The FIFO interface apparatus of claim 9 further comprising:
   a first read FIFO buffer coupled between the CPU and the GE, the first read FIFO buffer transferring command instructions and related information from the CPU to the GE;
   a second read FIFO buffer coupled between the CPU and the GE, the second read FIFO buffer transferring image data from the CPU to the GE;
   a third read FIFO buffer coupled between the GE and the frame buffer, the third read FIFO buffer transferring source pixel data from a source address in the frame buffer to the GE; and
   a fourth read FIFO buffer coupled between the GE and the frame buffer, the fourth read FIFO buffer transferring destination pixel data from a destination address in the frame buffer to the GE.

11. The FIFO interface apparatus of claim 10, wherein the related information indicating specific registers in the GE where the CPU source data starting address, the MIU source data starting address, the MIU destination data starting address, the data block width, and the data block height required for the command instruction are stored.

12. The FIFO interface apparatus of claim 9, wherein an initial starting write address is a starting address of a block of data processed by the GE.

13. The FIFO interface apparatus of claim 9, wherein each data packet further includes byte-enable bits indicating which byte of the predetermined number of data bits is enabled for display.

14. A computer system comprising:
   a central processing unit (CPU);
   system memory coupled to the CPU;
   a graphics/display controller coupled to the CPU and the system memory, the graphics controller comprising:
      a CPU interface unit (CIF) coupled to the CPU;
      a graphics engine (GE) coupled to the CIF;
      a memory interface unit (MIU) coupled to the GE;
      a frame buffer coupled to the MIU;
      a plurality of phase lock loop circuits; and
      a First-In-First-Out (FIFO) interface apparatus coupled to the CIF, the GE, and the MIU, the FIFO interface apparatus comprising a write FIFO buffer coupled to the GE and the frame buffer, the write FIFO buffer transferring data packets generated by the GE to the frame buffer, wherein each data packet comprising a predetermined number of data bytes processed by the GE, a first address flag bit, and a second address flag bit, the first and second address flag bits are used to determine a next write address in the frame buffer for storing the predetermined data bytes from an immediately subsequent data packet, the first address flag bit indicating whether the predetermined number of data bytes in each data packet are to be added to a present write address to determine the next write address, the second address flag bit indicating whether a number of bytes contained in a scan line are to be added to an updated starting write address to determine the next write address.

15. The computer system of claim 14, wherein the FIFO interface apparatus further comprising:
   a first read FIFO buffer coupled between the CIF and the GE, the first read FIFO buffer transferring command instructions and related information from the CPU to the GE;
   a second read FIFO buffer coupled between the CPU and the GE, the second read FIFO buffer transferring image data from the CPU to the GE;
   a third read FIFO buffer coupled between the GE and the frame buffer, the third read FIFO buffer transferring source pixel data from a source address in the frame buffer to the GE; and
   a fourth read FIFO buffer coupled between the GE and the frame buffer, the fourth read :FIFO buffer transferring destination pixel data from a destination address in the frame buffer to the GE.

16. The computer system of claim 15, wherein the FIFO interface apparatus further comprising:
   a line draw FIFO buffer coupled to a line draw engine that is connected to the GE, the line draw FIFO buffer coupled to the frame buffer, the line draw FIFO buffer transferring the first and second address flag bits from the line draw engine to the frame buffer, the first and second address flag bits are used to determine a next read address in the frame buffer for retrieving data stored in the read address of the frame buffer, the first address flag bit indicating whether the predetermined number of data bits in each data packet is to be added to a present read address to determine the next read address, the second address flag bit indicating whether a number of bytes contained in a scan line is to be added to an updated starting read address to determine the next read address.

17. The computer system of claim 16, wherein an initial read address is used to locate a starting point of the line.

18. The computer system of claim 15, wherein the related information indicating specific registers in the GE where the CPU source data starting address, the MIU source data starting address, the MIU destination data starting address, the data block width, and the data block height required for the command instruction are stored.

19. The computer system of claim 14, wherein an initial write address is a starting address of a block of data processed by the GE.

20. The computer system of claim 14, wherein each data packet further includes byte-enable bits indicating which byte of the predetermined number of data bits is enabled for display.

21. A method to reduce address information transferring between a Graphics Engine (GE) and a frame buffer, the method comprising:

transferring data packets generated by the GE to the frame buffer, wherein each data packet comprising a predetermined number of data bytes processed by the GE, a first address flag bit, and a second address flag bit; and determining a next write address in the frame buffer for storing the predetermined data bits from an immediately subsequent data packet using the first and second address flag bits, wherein the first address flag bit indicating whether the predetermined number of data bytes in each data packet are to be added to a present write address to determine the next write address, the second address flag bit indicating whether the number of bytes contained in a scan line is to be added to an updated starting write address to determine the next write address.

22. The method of claim 19 further comprising the steps:

transferring the first and second address flag bits from a line draw engine coupled to the GE to the frame buffer; and determining a next read address in the frame buffer for retrieving data stored in the read address of the frame buffer using the first and second address flag bits, wherein the first address flag bit indicating whether the predetermined number of data bytes in each data packet are to be added to a present read address to determine the next read address, the second address flag bit indicating whether the number of bytes contained in a scan line is to be added to an updated starting read address to determine the next read address.

* * * * *